United States Patent [19]

Yamamoto et al.

[11] Patent Number: 5,523,703
[45] Date of Patent: Jun. 4, 1996

[54] METHOD AND APPARATUS FOR CONTROLLING TERMINATION OF CURRENT DRIVEN CIRCUITS

[75] Inventors: Kanta Yamamoto; Katsuichi Ohara, both of Kawasaki, Japan

[73] Assignee: Fujitsu Limited, Kanagawa, Japan

[21] Appl. No.: 298,047

[22] Filed: Aug. 30, 1994

[30] Foreign Application Priority Data

Sep. 17, 1993 [JP] Japan ................................. 5-231661
Jul. 25, 1994 [JP] Japan ................................. 6-172433

[51] Int. Cl.⁶ ..................... H03K 17/16; H03K 19/0175
[52] U.S. Cl. ................................................ 326/30; 326/90
[58] Field of Search ......................... 326/30, 90; 375/35, 375/36; 333/22 R; 327/315, 318, 321, 322, 327, 330

[56] References Cited

U.S. PATENT DOCUMENTS 4,912,724  3/1990  Wilson ......................................... 375/7
4,982,115  1/1991  Lee ............................................. 326/30

FOREIGN PATENT DOCUMENTS 92139    6/1983  Japan.
8803731  5/1988  WIPO.

OTHER PUBLICATIONS

Active Terminators for CMOS Drivers, IBM Technical Disclosure Bulletin, vol. 32, No. 4A, Sep. 1989.
Adaptive Load, IBM Technical Disclosure Bulletin, vol. 22, No. 5, Oct. 1979, M. Bersac.

Primary Examiner—Edward P. Westin
Assistant Examiner—Richard Roseen

[57] ABSTRACT

A method of controlling termination of current driven circuits that bidirectionally transmit and receive a current driven signal, has the step of transmitting the current driven signal from a first one of the current driven circuits and receiving the signal by a second one of at least one of the current driven circuits while connecting only a termination circuit on the receiver side and disconnecting the other termination circuits. Therefore, the method of controlling termination of current driven circuits carries out simple termination switching control to prevent a decrease in the impedance of the output stage of the current driven circuit and transmit the current driven signal at correct amplitude.

30 Claims, 14 Drawing Sheets

METHOD AND APPARATUS FOR CONTROLLING TERMINATION OF CURRENT DRIVEN CIRCUITS

BACKGROUND OF THE INVENTION

1. Field of the Invention

The present invention relates to a method of and an apparatus for controlling termination of current driven circuits, and particularly, to a method of and an apparatus for controlling termination of current driven circuits in general electronic circuits that bidirectionally transmit and receive a current driven signal such as an ECL (Emitter Coupled Logic) signal or a PCML (Pseudo Current Mode Logic) signal.

2. Description of the Related Art

Recently, the scale of integrated circuits is increasing year by year. It is required to reduce the number of I/O pins by sharing the I/O pins. It is also required for circuits employing ECL signals to transfer data at a correct amplitude under dual or multiple termination control.

In the conventional termination circuit for a current driven circuit, a termination circuit is provided only for an ECL circuit serving as a receiver.

This termination circuit has, for example, a plurality of resistors and a capacitor, and is used to balance itself with an impedance line such as a 75-ohm strip line or a coaxial cable. However, in the prior art, when data are transmitted from one ECL circuit to another ECL circuit through the impedance line in one direction, the termination circuit works only for the receiver ECL circuit.

By the way, recently, an ECL signal has an amplitude of, for example, 1.0 V with a high level H of −0.8 V and a low level L of −1.8 V. The termination circuit regulates the current driven signal, i.e., the receiver ECL circuit so that the amplitude of the signal is maintained at 1.0 V around a threshold voltage of, for example, −1.3 V. To further improve an operation speed, a PCML (Pseudo Current Mode Logic) signal is employable. The PCML signal has two amplitudes 0.4 V and 0.8 V around threshold voltages of +1.6 V and +2.0 V, respectively.

In the ECL circuits employing the PCML signals, there is required to transfer data at a correct amplitude under dual or multiple termination control. The problems of the related art will be explained later in detail with reference to accompanying drawings.

SUMMARY OF THE INVENTION

An object of the present invention is to carry out simple termination switching control to prevent a decrease in the impedance of an output stage of each current driven circuit and transmit a current driven signal at a normal amplitude.

According to the present invention, there is provided a method of controlling termination of current driven circuits that bidirectionally transmit and receive a current driven signal, comprising the step of transmitting the current driven signal from a first one of the current driven circuits and receiving the signal by a second one of at least one of the current driven circuits while connecting only a termination circuit on the receiver side and disconnecting the other termination circuits.

The current driven signal may be an ECL signal, and the current driven circuits may be ECL circuits. The current driven signal may be a PCML signal. The termination circuits may be connected and disconnected through transistors.

The second current driven circuit may be single, and only the termination circuit for the second current driven circuit may be connected when the second current driven circuit receives the current driven signal from the first current driven circuit. The termination circuit for the second current driven circuit may be connected in response to a read or write signal for a memory of the second current driven circuit with the read or write signal being latched to extend its active period.

The second current driven circuits may be a plural, the plurality of second current driven circuits may receive the current driven signal from the first current driven circuit with the termination circuits for the respective second current driven circuits being connected.

The termination circuits for the second current driven circuits may be controlled by a termination controller. The termination circuits may be connected or disconnected in response to termination control signals produced from operation control signals for controlling the operations of the respective current driven circuits. The termination circuits may be connected or disconnected in response to the operation control signals which are the same as the operation control signals for controlling the operations of the respective current driven circuits.

The termination circuits may be connected or disconnected in response to the current driven signal. The termination circuits may be connected or disconnected in response to a TTL signal different from the current driven signal.

Further, according to the present invention, there is provided a method of controlling termination of current driven circuits that bidirectionally transmit and receive a current driven signal, comprising the steps of connecting only a termination circuit for a first one of the current driven circuits that is connected to an end of a bidirectional bus and disconnecting termination circuits for the other current driven circuits when transmitting the current driven signal in a first direction through the bidirectional bus; and connecting only a termination circuit for a second one of the current driven circuits that is connected to the other end of the bidirectional bus and disconnecting termination circuits for the other current driven circuits when transmitting the current driven signal in a second direction through the bidirectional bus.

According to the present invention, there is also provided an apparatus for controlling termination of current driven circuits that bidirectionally transmit and receive a current driven signal, comprising a bidirectional bus for transmitting the current driven signal, and the current driven circuits connected to the bidirectional bus; termination circuits provided for the current driven circuits; a connection unit for connecting only the termination circuit for the current driven circuit that receives the current driven signal; and a disconnection unit for disconnecting a termination circuit for the current driven circuit that transmits the current driven signal and termination circuits for the current driven circuits that do not transmit nor receive the current driven signal.

One of the current driven circuits may receive the current driven signal, and the connection unit may connect the termination circuit for the current driven circuit that receives the current driven signal. A plurality of the current driven circuits may receive the current driven signal, and the connection unit may connect the termination circuits for the current driven circuits that receive the current driven signal.

Each of the termination circuits may have a resistor unit and a capacitor unit, to regulate the amplitude of the current driven signal in a given range when the termination circuit is connected so that the corresponding current driven circuit receives the current driven signal. The resistor unit may have a first resistor unit and a second resistor unit, an end of the first resistor unit may be connected to the bidirectional bus, the other end of the first resistor unit may be connected to an end of the second resistor unit and to an end of the capacitor unit, and the other end of the second resistor unit and the other end of the capacitor unit may be connected to a power source line through one of the connection unit and the disconnection unit.

Further, according to the present invention, there is also provided an apparatus for controlling termination of current driven circuits that bidirectionally transmit and receive a current driven signal, comprising a bidirectional bus for bidirectionally transmitting the current driven signal; a first one of the current driven circuits connected to an end of the bidirectional bus; a first termination circuit provided for the first current driven circuit; a second one of the current driven circuits connected to the other end of the bidirectional bus; a second termination circuit provided for the second current driven circuit; a plurality of third ones of the current driven circuits connected to the bidirectional bus between the first and second current driven circuits; a first control unit for connecting the second termination circuit and disconnecting the first termination circuit when the current driven signal is transmitted from one to another of the current driven circuits in a direction from the first current driven circuit toward the second current driven circuit; and a second control unit for connecting the first termination circuit and disconnecting the second termination circuit when the current driven signal is transmitted from one to another of the current driven circuits in a direction from the second current driven circuit toward the first current driven circuit.

The first and second control unit may have each transistors. Each of the termination circuits may have a resistor unit and a capacitor unit, to regulate the amplitude of the current driven signal in a given range when the termination circuit is connected so that the corresponding current driven circuit receives the current driven signal.

The resistor unit may have a first resistor unit and a second resistor unit, an end of the first resistor unit may be connected to the bidirectional bus, the other end of the first resistor unit may be connected to an end of the second resistor unit and to an end of the capacitor unit, and the other end of the second resistor unit and the other end of the capacitor unit may be connected to a power source line through one of the connection and disconnection unit.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

For a better understanding of the preferred embodiments, the problems of the related art will be explained, with reference to FIGS. 1 to 4.

Figure 1:
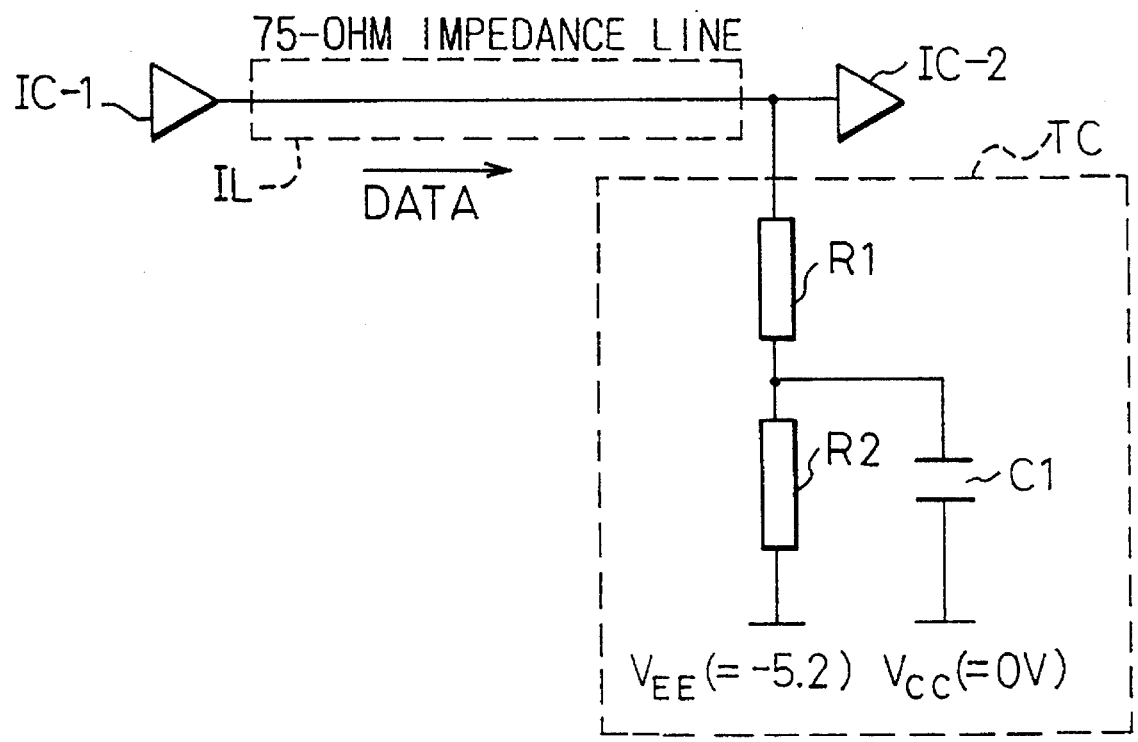
FIG. 1 is a circuit diagram showing an example of a termination circuit for current driven circuits according to the prior art.

FIG. 1 shows an example of a conventional termination circuit for a current driven circuit. Reference marks IC-1 and IC-2 are ECL circuits for transferring data, R1 and R2 are resistors, C1 is a capacitor, TC is the termination circuit, and IL is an impedance line such as a 75-ohm strip line or a coaxial cable.

The termination circuit TC of FIG. 1 has the resistors R1 and R2 and capacitor C1, to balance itself with the impedance line IL. The termination circuit TC is provided only for the ECL circuit IC-2 serving as a receiver. When data are transmitted from the ECL circuit IC-1 on the left side in FIG. 1 to the ECL circuit IC-2 on the right side in FIG. 1 through the impedance line IL in one direction, the termination circuit TC works only for the receiver ECL circuit IC-2.

In the termination circuit TC, the resistors R1 and R2 are connected in series between the impedance line IL to which the receiver ECL circuit IC-2 is connected and a first power source line VEE of −5.2 V. The capacitor C1 is connected between a node between the resistors R1 and R2 and a second power source line VCC of 0 V.

Figure 2:
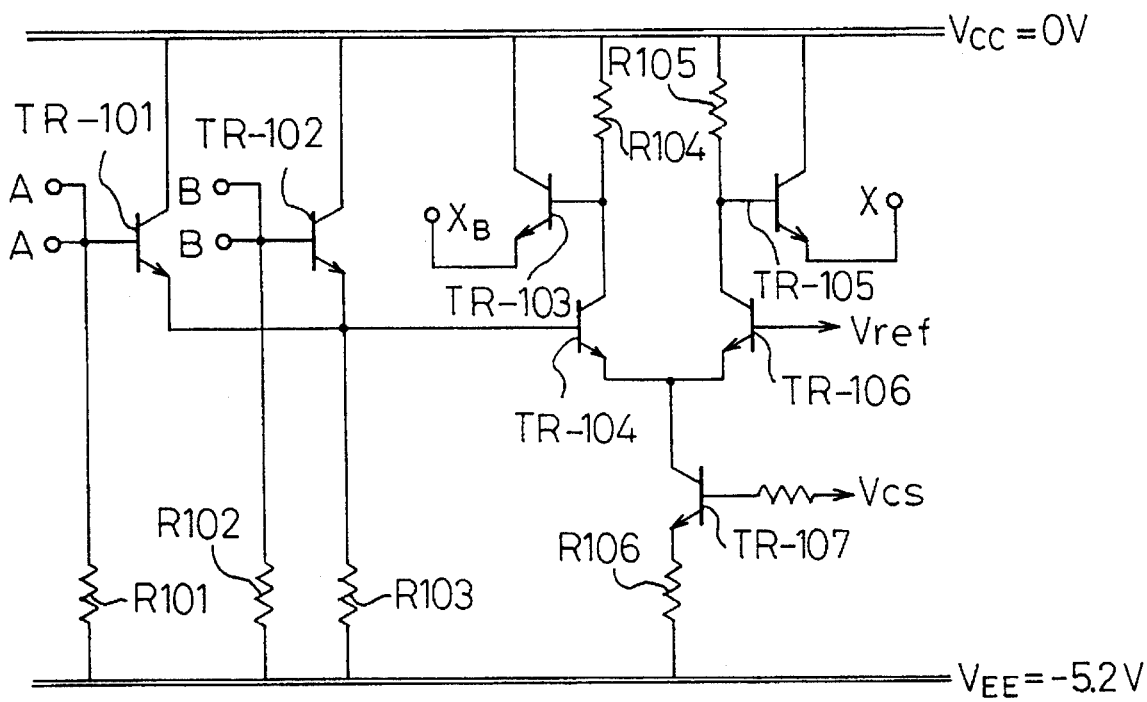
FIG. 2 is a circuit diagram showing an example of a dual termination system for current driven circuits according to the prior art.

FIG. 2 shows an OR/NOR gate as an example of the current driven circuit, i.e., the ECL circuit. The OR/NOR gate has npn bipolar transistors TR-101 to TR-107 and resistors R101 to R106. Reference marks A and B are inputs to the OR/NOR gate, Vref is a reference voltage, X is an OR output, and XB is a NOR output. An ECL signal has an amplitude of, for example, 1.0 V with a high level H of −0.8 V and a low level L of −1.8 V.

The termination circuit regulates the current driven signal, i.e., the ECL signal in the receiver current driven circuit, i.e., the receiver ECL circuit so that the amplitude of the signal is maintained at 1.0 V around a threshold voltage of, for example, −1.3 V. To further improve an operation speed, a PCML (Pseudo Current Mode Logic) signal is employable. The PCML signal has two amplitudes 0.4 V and 0.8 V around threshold voltages of +1.6 V and +2.0 V, respectively.

Figure 3:
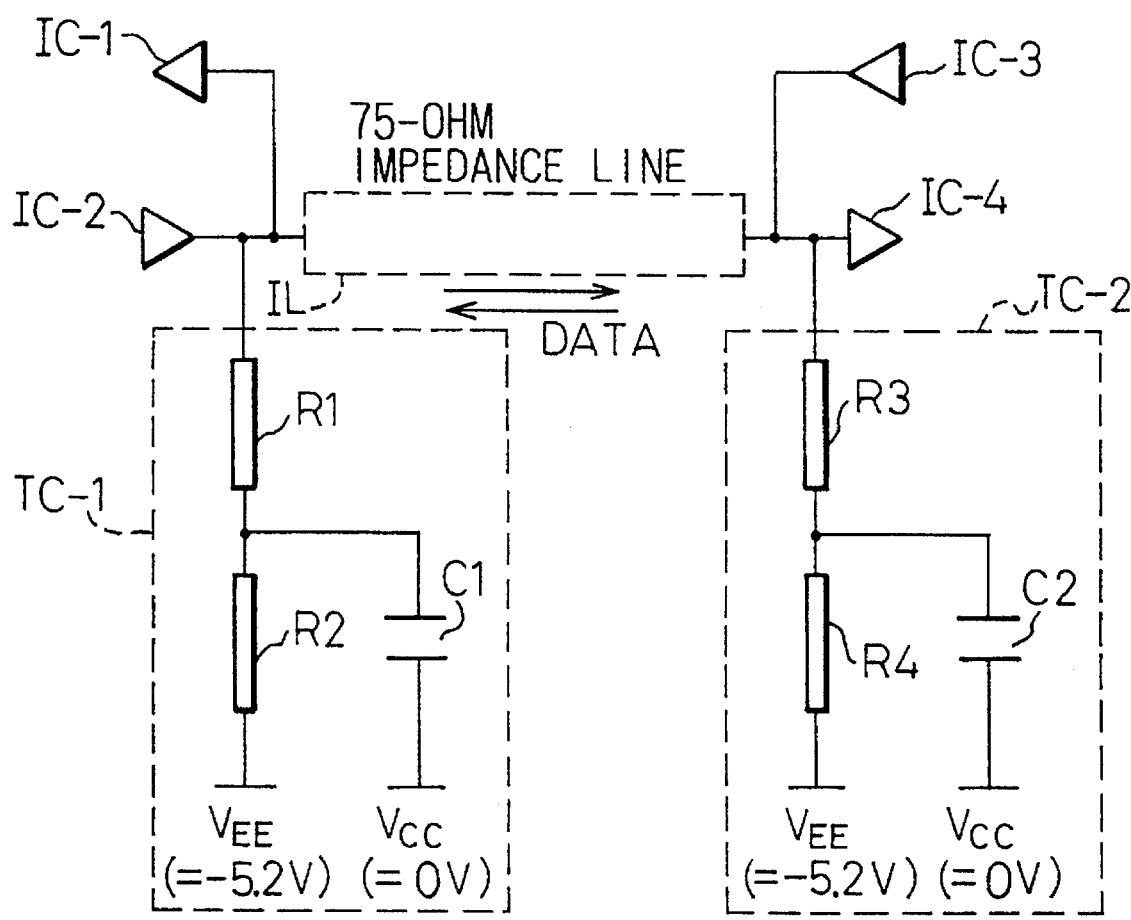
FIG. 3 is a circuit diagram showing an ECL circuit serving as a current driven circuit according to the related art.

FIG. 3 shows an example of a dual termination system for current driven circuits according to a related art. Reference marks IC-1 to IC-4 are ECL circuits for transmitting and receiving data, R1 and R2 are resistors, C1 and C2 are capacitors, TC-1 and TC-2 are termination circuits, and IL is an impedance line (a bidirectional bus) such as a 75-ohm strip line or a coaxial cable.

The dual termination system of FIG. 3 is bidirectional. Namely, data are transmitted from the ECL circuit IC-3 on the right side in FIG. 3 to the ECL circuit IC-1 on the left side in FIG. 3 through the impedance line IL. Data are also transmittable from the ECL circuit IC-2 on the left side in FIG. 3 to the ECL circuit IC-4 on the right side in FIG. 3 through the impedance line IL. The termination circuits TC-1 and TC-2 are provided for the bidirectional ECL circuits IC-1 and IC-2, respectively.

An impedance with respect to the emitter of an output transistor of the ECL circuit IC-3 (IC-2) is small and an emitter current becomes large, because the resistors R1 to R4 and capacitors C1 and C2 are all connected. The ECL circuit IC-3 is equal to the OR/NOR gate of FIG. 2. When the OR output X of the OR/NOR gate (IC-3) is transferred to the ECL circuit IC-1 through the impedance line IL, an impedance with respect to the emitter of the output transistor TR-105 of the OR output X becomes small. Accordingly, a drop in an output voltage due to the resistor R105 connected to the base of the output transistor TR-105 becomes influential, to decrease the high level H of the ECL (PCML) signal and reduce the amplitude of the same signal. In this case, data will not be correctly transferred.

Figure 4:
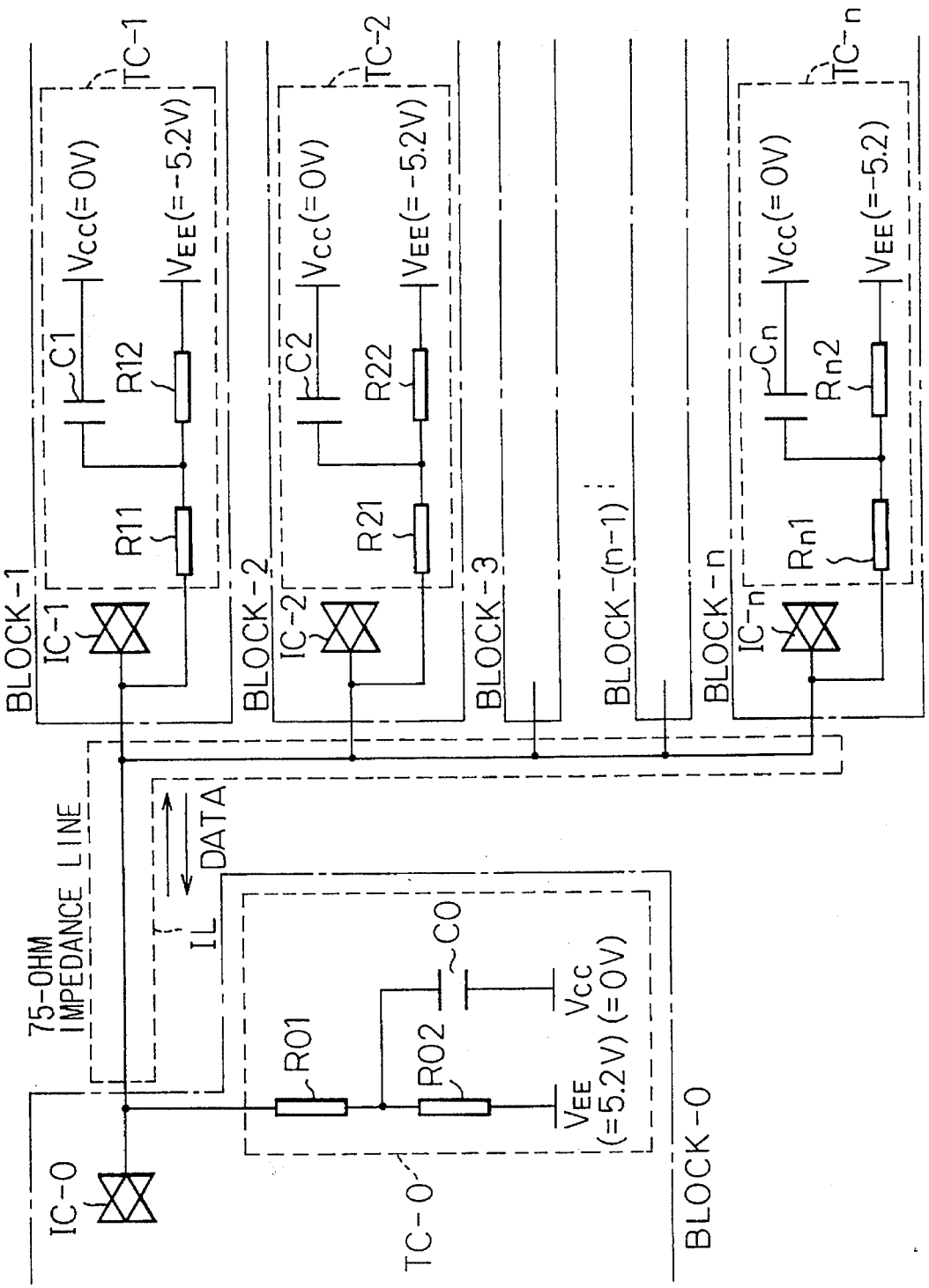
FIG. 4 is circuit diagram showing an example of a dual termination system for current driven circuits according to a related art.

FIG. 4 shows an example of a multiple termination system for current driven circuits according to a related art. Multiple termination circuits are connected to an address/data bus through which data are transferred between ones of the current driven circuits selected by an ECL signal. Reference marks IC-1 to IC-n are the ECL circuits for transmitting and receiving data, R01 and R02 to Rn1 and Rn2 are resistors, C1 to Cn are capacitors, IL is an impedance line, and TC-1 to TC-n are the termination circuits having the resistors R01 and R02 to Rn1 and Rn2 and capacitors C1 to Cn.

Data are bidirectionally transferred between optional ones of the ECL circuits IC-0 to IC-n. The termination circuits are provided for the bidirectional bus (impedance line) IL.

An impedance with respect to the emitter of an output stage of an optional one of the IC-0 to IC-n, for example, the ECL circuit IC-0 is smaller than that of the dual termination system of FIG. 3 because the termination circuits TC-1 to TC-n for the ECL circuits IC-0 to IC-n are all connected to the bidirectional bus. Namely, the resistors R01 and R02 to Rn1 and Rn2 and capacitors C0 to Cn are all connected to the impedance line IL, to reduce the impedance.

This results in further increasing an emitter current. The ECL circuit IC-0 is equal to the OR/NOR gate of FIG. 2. When the OR output X of the OR/NOR gate (IC-0) is transferred to the ECL circuit IC-n through the impedance line IL, an impedance with respect to the emitter of the output transistor TR-105 of the OR output X is smaller than that of the dual termination system of FIG. 3. As a result, an output voltage drop due to the resistor R105 connected to the base of the output transistor TR-105 becomes seriously influential.

In the dual termination system of FIG. 3, an impedance of the emitter of the output stage of, for example, the ECL circuit IC-3, i.e., the emitter of the output transistor TR-105 of FIG. 2 is small to increase an emitter current. If the emitter current of the output stage of the ECL circuit IC-3 is too high, a current starts to flow from the base of the output transistor TR-105 to the emitter of the same, to drop base potential. This lowers the high level H of the current driven signal, i.e., the ECL or PCML signal, thereby reducing the amplitude of the signal.

A decrease in the amplitude of the current driven signal may be sometimes canceled by setting the values of the terminal resistors slightly higher than ordinary values. These values of the terminal resistors, however, must be optimized through calculations, simulations, and tests. If the resistor values are too large, it will be difficult to obtain a sufficient emitter current, and therefore, the amplitude of the current driven signal will not be regulated in a normal range.

In the multiple termination system of FIG. 4, an impedance with respect to the emitter of the output stage of, for example, the ECL circuit IC-0, i.e., the emitter of the output transistor TR-105 of FIG. 2 is smaller than that of the dual termination system of FIG. 3, to further increase the emitter current. This will not be dealt only with changing the values of the terminal resistors. An increase in the emitter current due to a decrease in the output impedance will not only decrease the amplitude of the current driven signal, i.e., ECL or PCML signal but also damage the output stage of the ECL circuit in the worst case.

Below, the preferred embodiments of a semiconductor memory device according to the present invention will be explained, with reference to the accompanying drawings.

Figure 5:
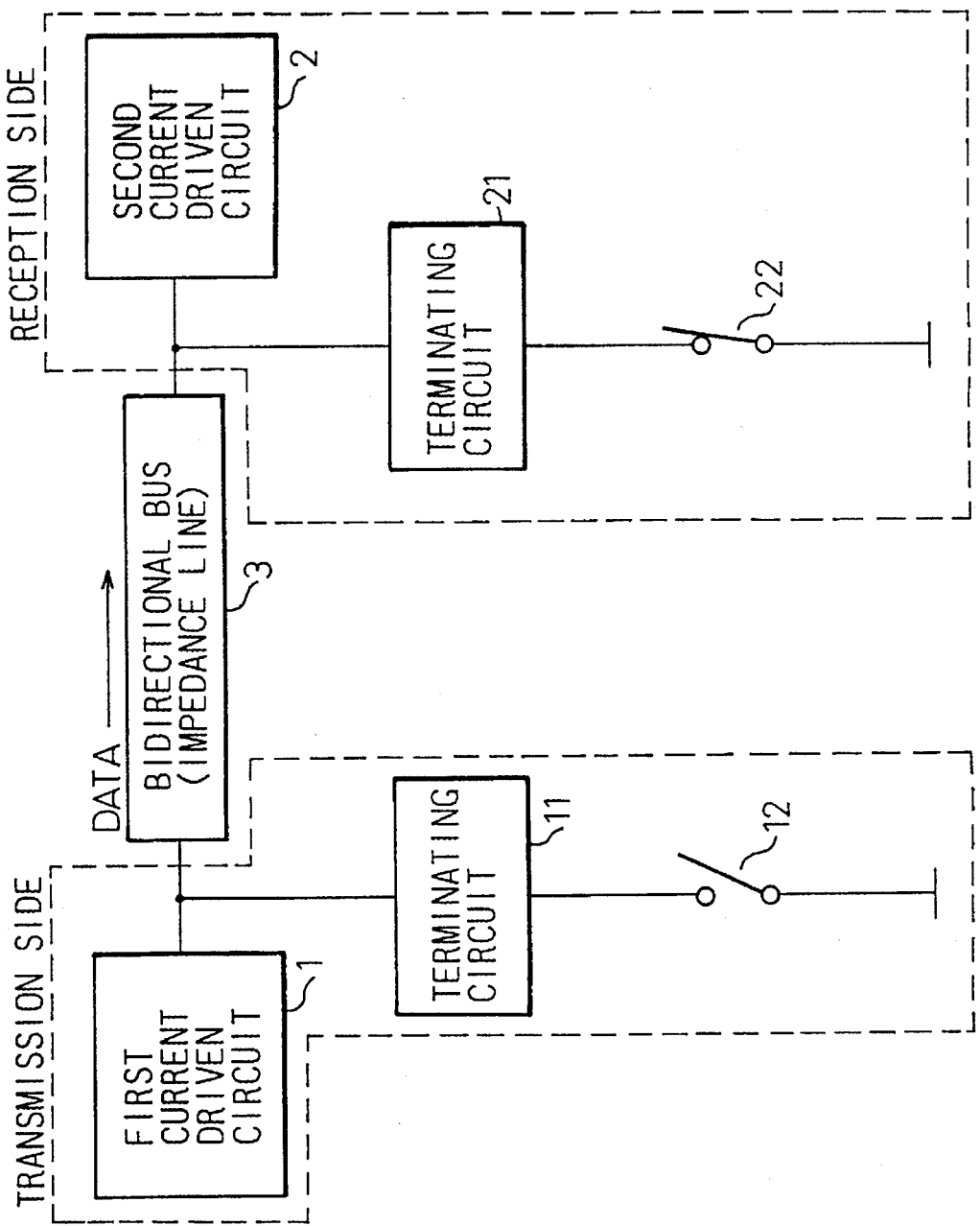
FIG. 5 is a block diagram showing a principle of an apparatus for controlling termination of current driven circuits according to the present invention.

FIG. 5 shows a principle of an apparatus for controlling termination of current driven circuits according to the present invention.

The current driven circuits bidirectionally transmit and receive a current driven signal. The present invention provides a method of controlling termination of these current driven circuits. A first one (1) of the current driven circuits transmits the current driven signal and a second one (2) of the current driven circuits receives the signal. At this time, only a termination circuit (21) on the receiver side is connected (22) and the other termination circuits (11) are disconnected (12). According to the method of the present invention, the first current driven circuit 1 transmits the current driven signal, and the second current driven circuit 2 receives the signal. AT this time, a switch 22 is closed to connect only the termination circuit 21 on the receiver side, and a switch 12 is opened to disconnect the other termination circuit 11.

Namely, the switch 22 for the second current driven circuit 2 on the receiver side connects the termination circuit 21, and the switch 12 for the first current driven circuit 1 on the transmitter side disconnects the termination circuit 11. In this way, the method according to the present invention carries out simple termination switching control to prevent a decrease in the impedance of the output stage of the current driven circuit and transmit the current driven signal at correct amplitude.

Figure 6:
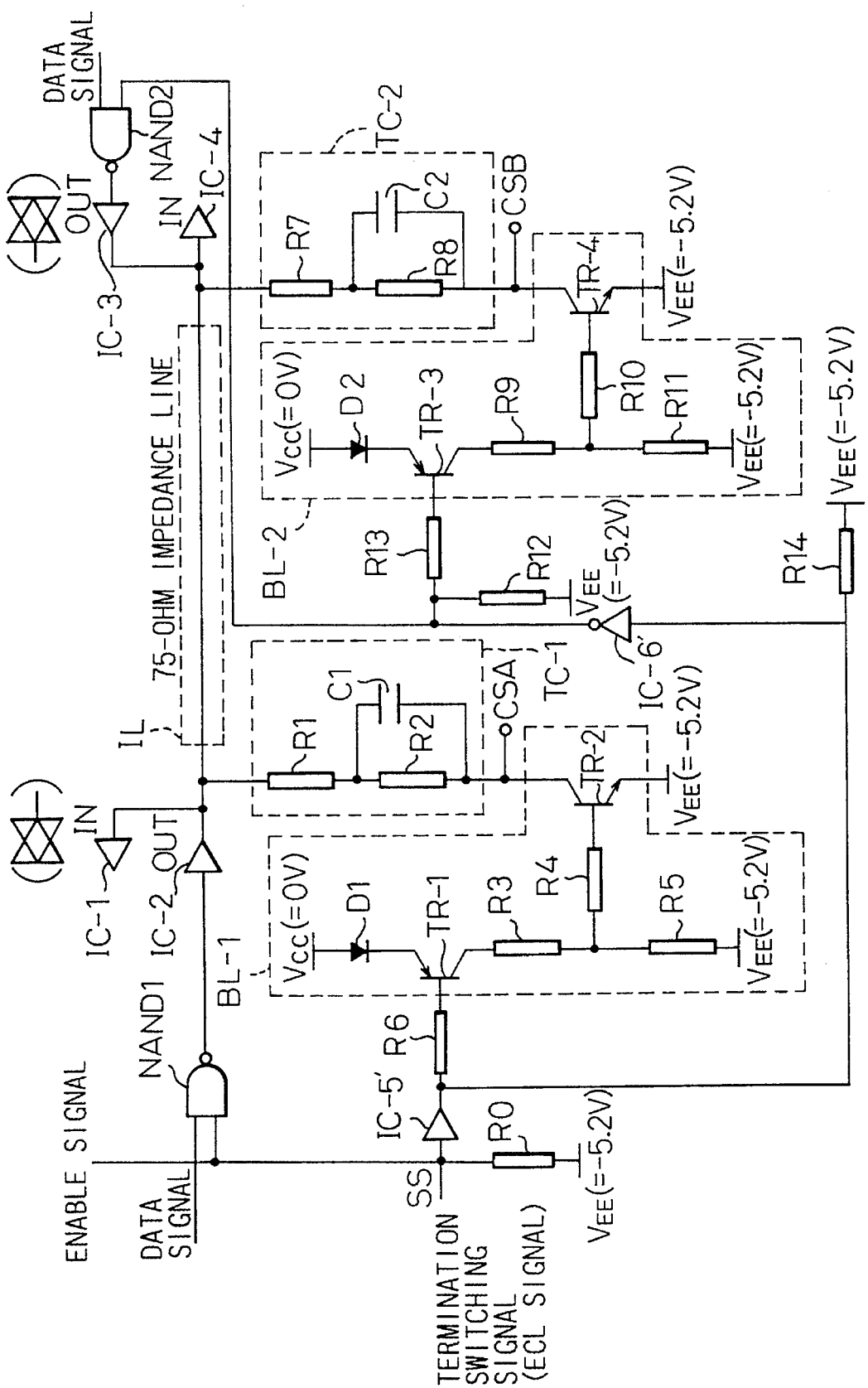
FIG. 6 is a circuit diagram showing an apparatus for controlling termination of current driven circuits according to an embodiment of the present invention.

FIG. 6 shows an apparatus for controlling termination of current driven circuits according to an embodiment of the present invention. Reference marks IC-1 to IC-4 are ECL circuits for transmitting and receiving data, IC-5' is a buffer amplifier, IC-6' is an inverter, and R0 to R14 are resistors. Reference marks C1 and C2 are capacitors, IL is an impedance line of, for example, 75 ohms, NAND1 and NAND2 are NAND gates, and D1 and D2 are diodes.

FIG. 6 shows a bidirectional dual termination system in which data are transmitted from the ECL circuit IC-3 on the right side in FIG. 6 to the ECL circuit IC-1 on the left side in FIG. 6 through the impedance line IL, and from the ECL circuit IC-2 on the left side in FIG. 6 to the ECL circuit IC-4 on the right side in FIG. 6 through the impedance line IL.

When data are transferred from the ECL circuit IC-2 to the ECL circuit IC-4 through the impedance line IL, a termination switching signal SS is provided to connect only a last terminating block BL-2 for the ECL circuits IC-4 and IC-3 on the right side in FIG. 6 and disconnect the other terminating block BL-1 for the ECL circuits IC-1 and IC-2 on the left side in FIG. 6. The termination switching signal SS is a DC signal, so that no capacitors are required for AC impedance matching but the resistors R12 and R14 are sufficient.

According to the embodiment, the termination switching signal SS is an enable signal for controlling data supplied to the ECL circuits IC-2 and IC-3. When the enable signal, i.e., the termination switching signal SS is at high level H, a data signal supplied to the NAND gate NAND1 is inverted and provided outside, and a data signal supplied to the NAND gate NAND2 is not provided outside. Namely, the output of the NAND gate NAND2 is fixed at low level L. When the enable signal is at low level L, the data signal supplied to the NAND gate NAND1 is not provided outside. Namely, the output of the NAND gate NAND1 is fixed at low level L. On the other hand, the data signal to the NAND gate NAND 1 is inverted and provided outside.

When data are transferred from the ECL circuit IC-2 to the ECL circuit IC-4 through the impedance line IL, the termination switching signal SS is set to high level H. As a result, the base of a pnp bipolar transistor TR-1 receives −0.8 V through the buffer IC-5' and resistor R6. Due to a voltage drop of base-emitter voltage VBE, the transistor TR-1 is unable to apply a voltage of about 0.7 V to cause a current to flow through the diode D-1. Since no current flows from the emitter of the transistor TR-1 to the base thereof, the transistor TR-1 is turned OFF.

Therefore, no current flows through the resistors R3 and R5, and a voltage VEE of −5.2 V appears at the base of an npn bipolar transistor TR-2. Accordingly, the transistor TR-2 is also turned OFF, and the termination circuit TC-1 having the resistors R1 and R2 and capacitor C1 is disconnected from the block BL-1 for the ECL circuits IC-1 and IC-2. At this time, the data signal supplied to the NAND gate NAND1 is inverted and provided to the ECL circuit IC-2, which transfers the same to the ECL circuit IC-4 through the impedance line IL.

In the block BL-2 for the ECL circuits IC-3 and IC-4, the termination switching signal SS is supplied to the base of a pnp bipolar transistor TR-3 through the buffer IC-5', inverter IC-6', and resistor R13 (R12). Namely, the logic of the termination switching signal SS of −1.6 V is inverted by the inverter IC-6' and supplied to the base of the transistor TR-3. The diode D-2 receives a voltage of about 0.7 V, which is applied as a base-emitter voltage VBE of the transistor TR-3, to turn ON the transistor TR-3. Then, a current flows through the resistors R9 and R11, to turn ON an npn bipolar transistor TR-4.

Consequently, the termination circuit TC-2 having the resistors R7 and R8 and capacitor C2 is connected to the block BL-2 for the ECL circuits IC-3 and IC-4. At this time, the output of the NAND gate NAND2 connected to the input of the ECL circuit IC-3 is fixed at low level L. The resistors R6 and R13 control currents flowing to the bases of the transistors TR-1 and TR-3 when these transistors are ON. The ECL signal may be defined by a high level H of −0.8 V, a low level L of −1. 8 V, and an amplitude of 1.0 V. The termination circuits TC-1 and TC-2 regulate the level of the current driven signal (ECL signal) in the current driven circuit (ECL circuit) on the receiver side so that the ECL signal has an amplitude of 1.0 V around a threshold voltage of, for example, −1.3 V. The present invention is applicable to high-speed circuits handling PCML signals employing two amplitudes of, for example, 0.4 V and 0.8 V around threshold voltages of +1.6 V and +2.0 V.

To transfer data from the ECL circuit IC-3 to the ECL circuit IC-1 through the impedance line IL, the termination switching signal SS is set to low level L. This turns ON the transistors TR-1 and TR-2. As a result, the termination circuit TC-1 is connected to the block BL-1 for the ECL circuits IC-1 and IC-2. At this time, the transistors TR-3 and TR-4 are turned OFF in the block BL-2 for the ECL circuits IC-3 and IC-4, so that the termination circuit TC-2 is disconnected from the block BL-2.

As explained above, this embodiment connects the termination circuit on the receiver side of the current driven signal (ECL signal) and disconnects the termination circuit on the transmitter side of the current driven signal. This embodiment prevents a decrease in the impedance of the output stage of each current driven circuit and transfers data at a normal amplitude.

Figure 7:
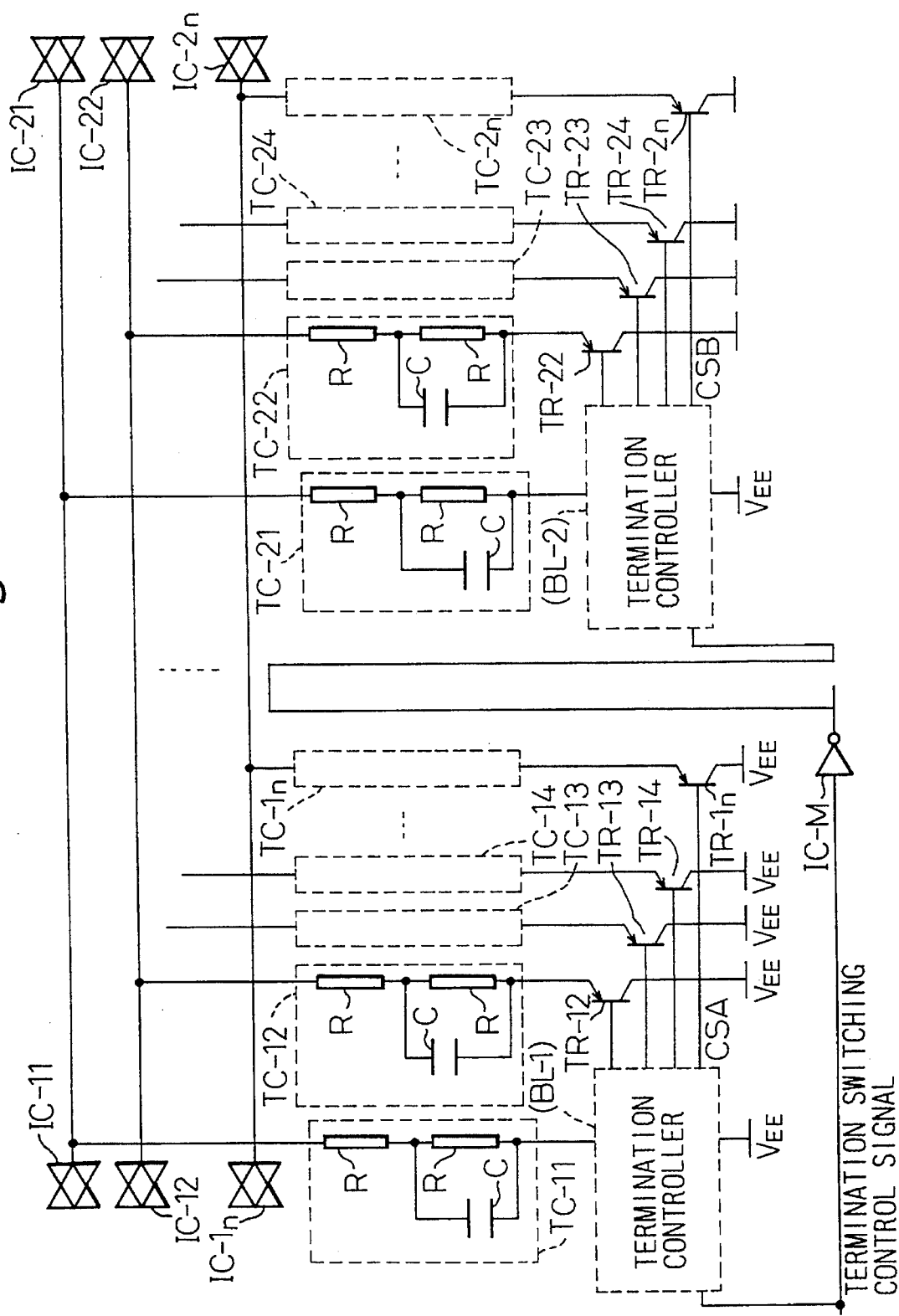
FIG. 7 is a circuit diagram showing an apparatus for controlling termination of current driven circuits according to another embodiment of the present invention.

FIG. 7 shows an apparatus for controlling termination of current driven circuits according to another embodiment of the present invention. This embodiment applies the bidirectional dual termination system of FIG. 6 to pairs of ECL circuits IC-11 and IC-21, IC-12 and IC-22, ..., and IC-1n and IC-2n.

The ECL circuit pairs IC-12 and IC-22 to IC-1n and IC-2n are provided with pnp bipolar transistor pairs TR-12 and TR-22 to TR-1n and TR-2n, respectively. Termination controllers BL-1 and BL-2 control connection of pairs of termination circuits TC-11 and TC-21 to TC-1n and TC-2n. The termination circuits TC-11 and TC-21 of the ECL circuits IC-11 and IC-21 are directly controlled by the termination controllers BL-1 and BL-2, respectively. The bases of the transistors TR-12 to TR-1n for controlling termination of the ECL circuits IC-12 to IC-1n receive a first control signal CSA. The bases of the transistors TR-22 to TR-2n for controlling termination of the ECL circuits IC-22 to IC-2n receive a second control signal CSB.

The first control signal CSA is fetched from a node between the resistor R2 and the collector of the transistor TR-2 in the dual termination system of FIG. 6. The second control signal CSB is fetched from a node between the resistor R8 and the collector of the transistor TR-4 in the dual termination system of FIG. 6. When the npn bipolar transistor TR-2 is turned OFF in the dual termination system of FIG. 6, the termination circuit TC-11 is disconnected if the termination switching signal SS is at high level H. In this case, the first control signal CSA becomes high level H to turn OFF the pnp bipolar transistors TR-12 to TR-1n, to disconnect the termination circuits TC-12 to TC-1n.

Similarly, when the npn bipolar transistor TR-4 in the dual termination system of FIG. 6 is turned OFF, the termination circuit TC-21 is disconnected if the termination switching signal SS is at low level L. In this case, the second control signal CSB becomes high level H to turn OFF the pnp bipolar transistors TR-22 to TR-2n of FIG. 7. As a result, the termination circuits TC-22 to TC-2n are disconnected. In this way, the dual termination system of FIG. 6 is applicable to the pairs of the ECL circuits IC-11 and IC-21 to IC-1n and IC-2n of FIG. 7 for bidirectionally transmitting data. The arrangement employing the first and second control signals CSA and CSB and pnp bipolar transistor pairs TR-12 and TR-22 to TR1n and TR-2n can be modified in various ways.

Figure 8:
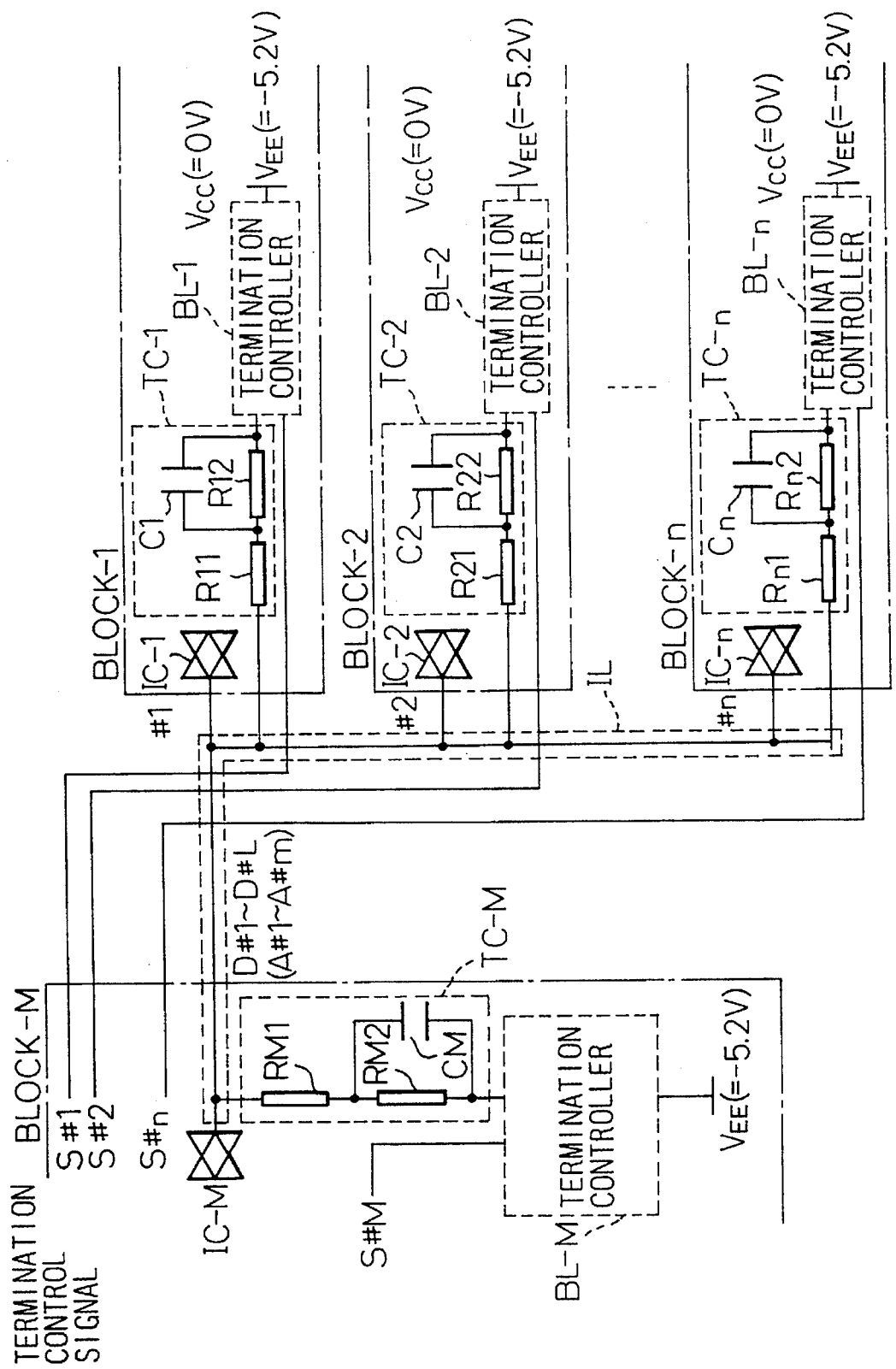
FIG. 8 is a circuit diagram showing an apparatus for controlling termination of current driven circuits according to still another embodiment of the present invention.

FIG. 8 shows an apparatus for controlling termination of current driven circuits according to still another embodiment of the present invention. This is multiple termination switching control carried out on an ECL signal bus. Through the address/data bus, an ECL output is connected to a plurality of inputs, to bidirectionally transfer data. According to termination control signals S#M and S#1 to S#n, a termination circuit only for an input that receives the data is connected and the other first and intermediate termination circuits are disconnected, so that the selected input receives the data at a normal amplitude.

The ECL signal bus IL is a bidirectional bus for transferring data D#i to D#n and is connected to all ECL circuits IC-M and IC-1 to IC-n in the blocks M and 1 to n.

The block M on the left side in FIG. 8 has a microprocessor MPU to read and write data from and to memories in the other blocks 1 to n on the right side in FIG. 8. The block M generates the control signals S#I to S#n for the respective blocks according to a write enable signal WE and a read enable signal RE, to control connection of the termination circuits TC-1 to TC-n.

Figure 9:
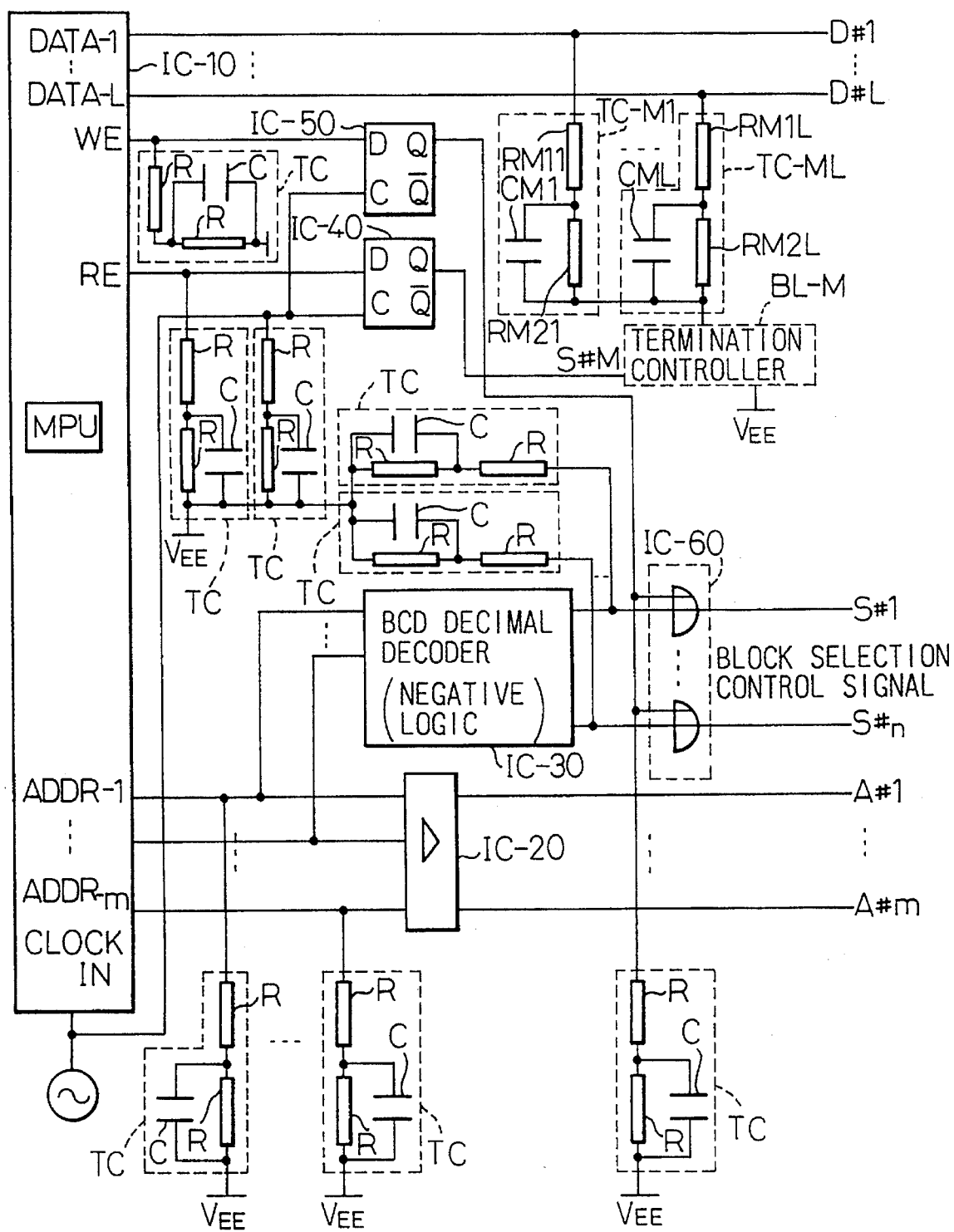
FIG. 9 is a circuit block diagram showing an example of a circuit for generating control signals used by the apparatus of FIG. 8.

FIG. 9 shows a circuit for generating the control signals S#M and S#1 to S#n for controlling the block M and the memories of the blocks 1 to n. These signals S#M and S#i to S#n are generated in the block M having the MPU.

Figure 10:
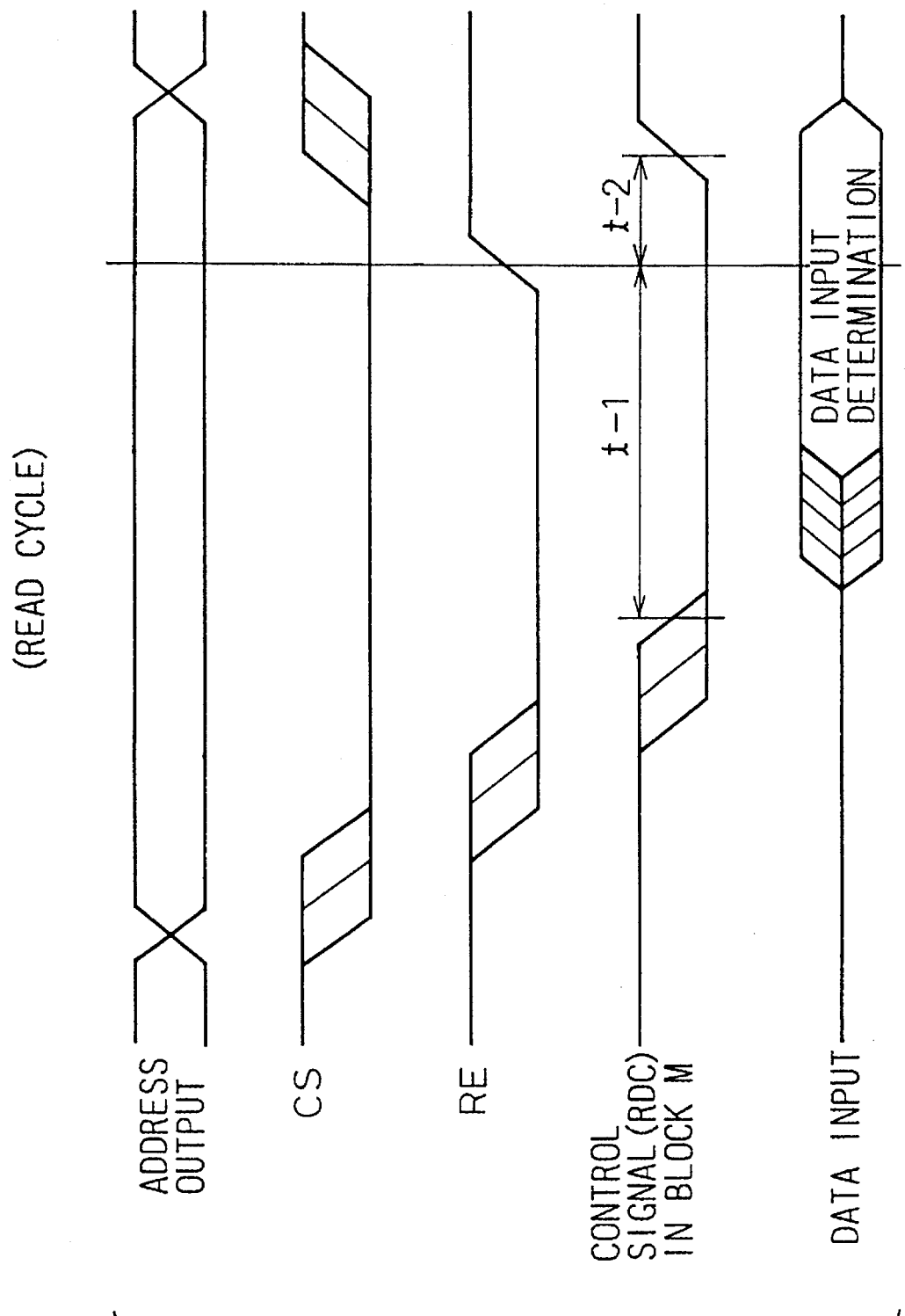
FIG. 10 is a timing chart explaining an operations of the apparatus of FIG. 8.
Figure 11:
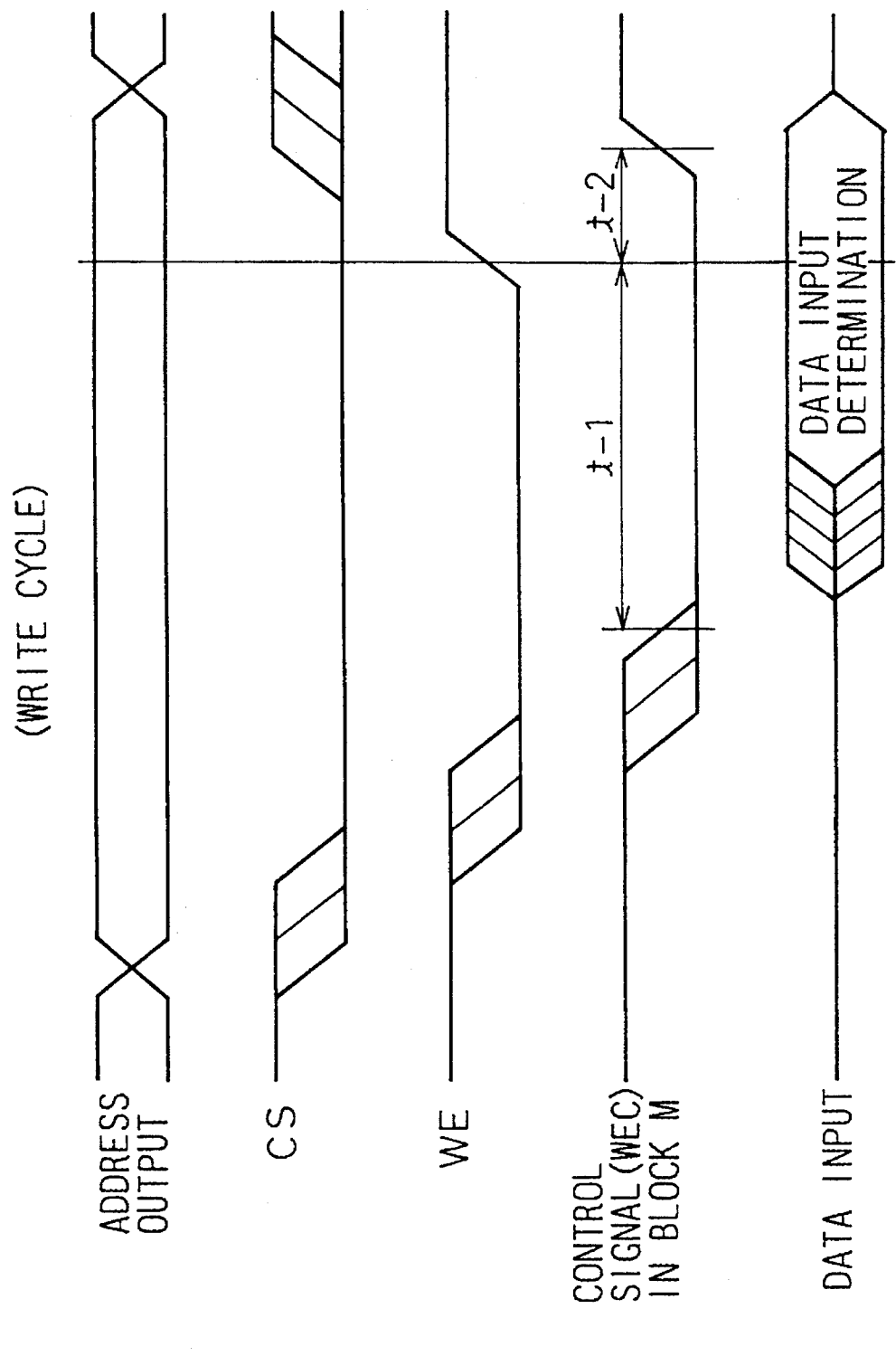
FIG. 11 is a timing chart explaining another operations of the apparatus of FIG. 8.

FIGS. 10 and 11 are timing charts explaining the operations of the termination control apparatus of FIG. 8, in which FIG. 10 shows a read cycle in the block M and FIG. 11 shows a write cycle in the block M. A reference mark CS is a chip select signal.

When data are fetched from each block in response to a rise of the signal RE or WE, the data must be maintained for a while after the trigger. In the circuit of FIG. 9, a flip-flop IC-40 shifts the signal RE or WE by one bit. If required, a definite period t-2 may be more than one bit. It is necessary to consider a cycle for an access process in a read or write cycle.

In the read cycle, the block M fetches data from one of the blocks 1 to n. In this case, the termination control signals S#M and S#1 to S#n are generated to connect the termination circuit TC-M (TC-M1 to TC-ML) for the block M and disconnect the termination circuits TC-1 to TC-n for the blocks 1 to n. More precisely, these termination control signals are generated by shifting the read enable signal RE by the flip-flop IC-40 as shown in FIG. 9. The signal RE is a low-active signal, which is shifted by one bit by the flip-flop IC-40 and is used as the termination control signals.

The reason why the signal RE is shifted by one bit is to secure a hold time for the MPU. If the hold time is zero, the signal RE will not be shifted. A BCD decimal decoder IC-30 of negative logic selects one of the blocks 1 to n from which data are read. In FIG. 9, the termination circuits are connected to signal lines for the signals WE, RE, etc., as well as address signal lines extending from an ECL circuit IC-10 to an ECL circuit IC-20, etc.

In FIGS. 8 and 9, the decoder IC-30 of negative logic decodes a block selection signal in the address bus, to find a block to be accessed. A logic circuit, i. e., an OR gate IC-60 calculates an OR of the decoded signal and the write enable signal WE, to generate the termination control signals S#1 to S#n for controlling termination of addresses and data. Here, the termination control signals S#1 to S#n are each at low level L to disconnect the termination circuits TC-1 to TC-n for the blocks 1 to n.

The termination control signal S#M for the block M to read data is set to low level L so that only the termination circuit TC-M for the block M is connected.

Namely, only the last block M for the ECL signal is terminated, and the other blocks 1 to n are disconnected from the termination circuits. The flip-flop IC-50 shifts the termination control signal S#M from a period t-1 by one bit to t-2 to make a low-level period of (t-1)+(t-2) in consideration of a hold time of the MPU or the memory of the block to be accessed.

In a write cycle, the block M transfers data to one of the blocks 1 to n. In this case, the termination circuit for the block M is disconnected, and the termination circuit for the block that receives the data is connected. Namely, the termination control signal S#M to the block M is set to high level H, and only the termination control signal supplied to the block among the blocks 1 to n selected according to the chip select signal CS is set to low level L. As a result, only the termination circuit for the block that is going to receive the data is connected.

The signal WE must be at low level L during the write cycle. This may be changed depending on MPUs. In consideration of the hold time of the memory or MPU of the block to be accessed, the flip-flop IC-50 shifts the termination control signal S#M by one bit from t-1 to t-2, to make a low-level period of (t-1)+(t-2). In connection with the address bus, data are always provided by the block M both in the read and write cycles, so that the termination circuit for the last destination block may be fixedly connected.

Figure 12:
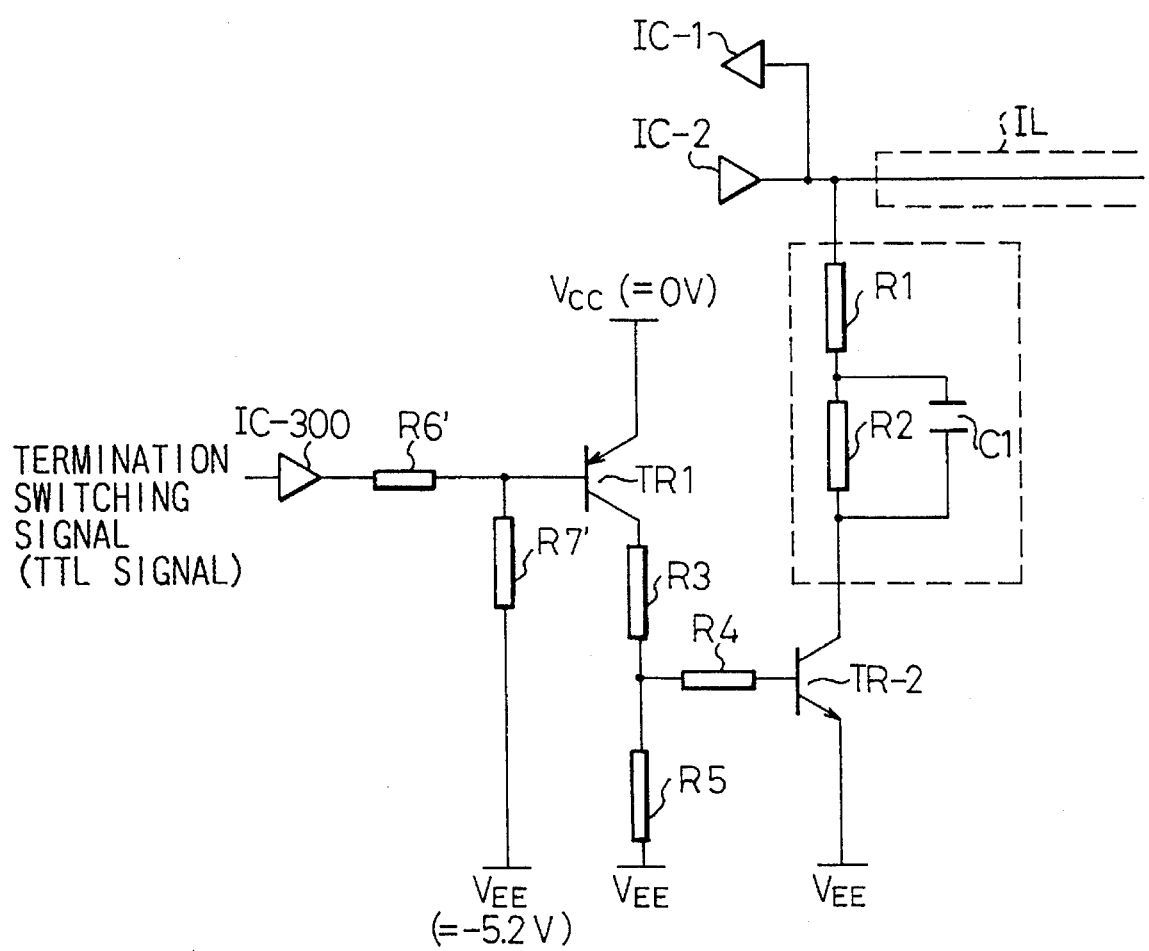
FIG. 12 is a circuit diagram showing a modification of the apparatus of FIG. 6.

FIG. 12 shows an apparatus for controlling termination according to a modification of the embodiment of FIG. 6. This modification employs a TTL signal instead of the ECL signal as a termination control signal. For example, a TTL signal of high level H (=5 V) is passed through a buffer IC-300, shifted into an ECL level signal with use of voltage drops by resistors R6' and R7', and applied to the base of a pnp bipolar transistor TR-1. In this way, the TTL signal can control a termination circuit.

The above embodiments bidirectionally transfer data with an ECL signal by controlling termination circuits both on the transmitter and receiver sides such that only the termination circuit for the circuit that receives the ECL signal is connected and the other termination circuits are disconnected. This technique prevents fluctuations in the output level of the ECL signal and transfers data at a normal amplitude. The termination circuits share a bus, to minimize circuit scale. The termination control signal may be not only the ECL level signal but also any other signal such as a TTL level signal.

Figure 13:
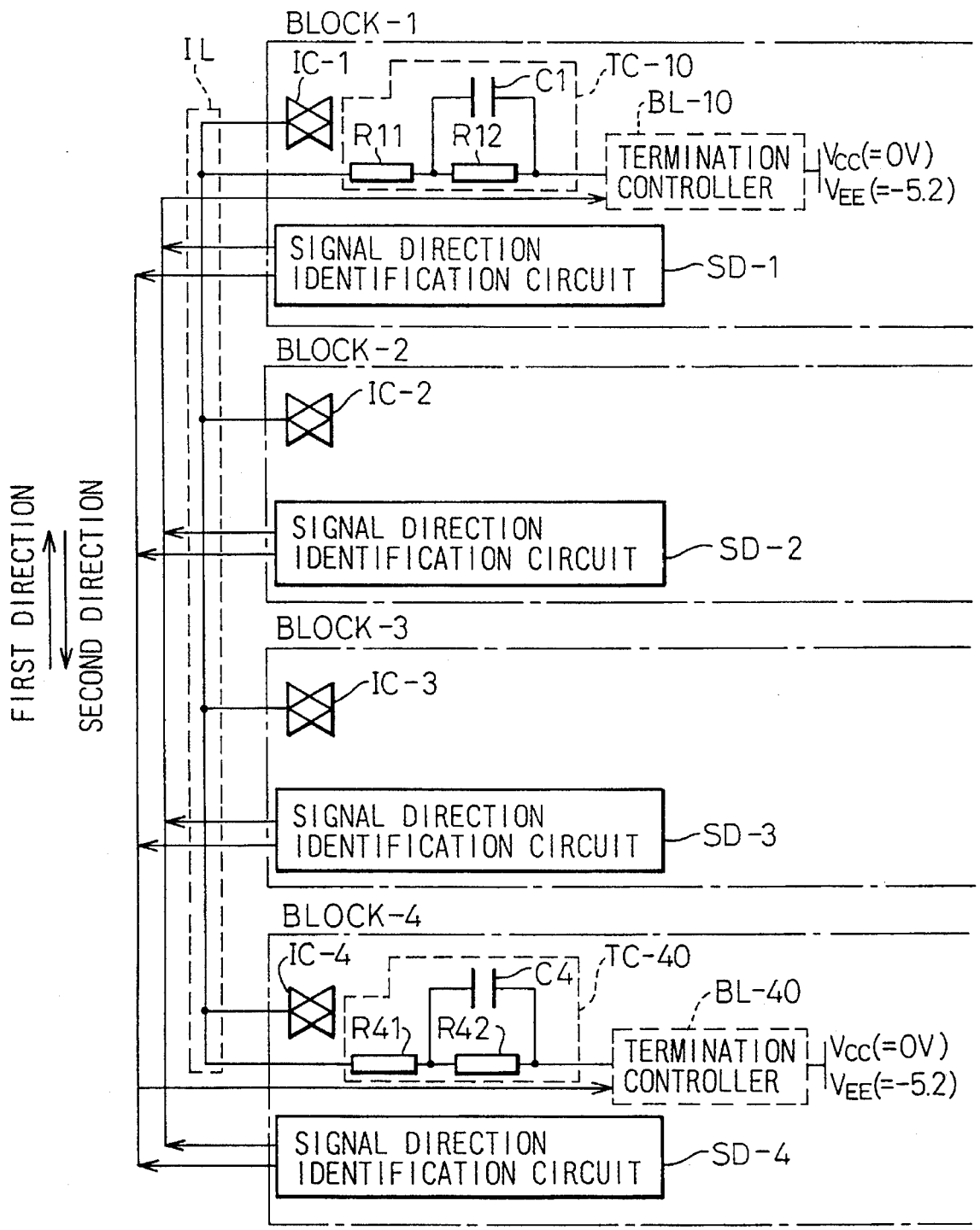
FIG. 13 is a circuit diagram showing an apparatus for controlling termination of current driven circuits according to still another embodiment of the present invention.

FIG. 13 shows an apparatus for controlling termination of current driven circuits according to still another embodiment of the present invention.

Blocks 1 and 4 are arranged at each end of a bidirectional bus, i.e., an impedance line IL. Only these blocks 1 and 4 are provided with termination circuits TC-10 and TC-40 and termination controllers BL-10 and BL-40. Blocks 1 to 4 are provided with signal identification circuits SD-1 to SD-4, respectively, for identifying the direction of a current driven signal (an ECL signal). The blocks 2 and 3 disposed between the blocks 1 and 4 are provided with ECL circuits IC-2 and IC-3 and the signal identification circuits SD-2 and SD-3, respectively. No termination circuits or termination controllers are provided for the blocks 2 and 3.

When data (a current driven signal) is transmitted in a first direction from the ECL circuit IC-4 toward the ECL circuit IC-1, i.e., from the block 4 toward the block 1, only the termination circuit TC-10 for the block 1 is connected. When the data is transmitted in a second direction from the ECL circuit IC-1 toward the ECL circuit IC-4, i.e., from the block 1 toward the block 4, only the termination circuit TC-40 for the block 4 is connected. More precisely, when the data is transmitted from the ECL circuit IC-4 to any one of the ECL circuits IC-3 to IC-1, or from the ECL circuit IC-3 to one of the ECL circuits IC-2 and IC-1, or from the ECL circuit IC-2 to the ECL circuit IC-1, the signal identification circuits SD-1 to SD-4 of the blocks 1 to 4 determine that the data is transmitted in the first direction and provide a control signal to the termination controller BL-10 of the block 1, to connect the termination circuit TC-10.

On the other hand, when the data is transferred from the ECL circuit IC-1 to any one of the ECL circuits IC-2 to IC-4, or from the ECL circuit IC-2 to one of the ECL circuits IC-3 and IC-4, or from the ECL circuit IC-3 to the ECL circuit IC-4, the signal identification circuits SD-1 to SD-4 of the blocks 1 to 4 determine that the data is transmitted in the second direction and supply a control signal to the termination controller BL-40 of the block 4, to connect the termination circuit TC-40. Although FIG. 13 shows four blocks 1 to 4, the number of the blocks will not be limited to four.

Compared with the apparatus of FIG. 8, the apparatus of FIG. 13 is not required to arrange the termination circuits (TCs) and termination controllers (BLs) for every block, so that the embodiment of FIG. 13 can reduce the number of signal lines for controlling the termination controllers.

Figure 14:
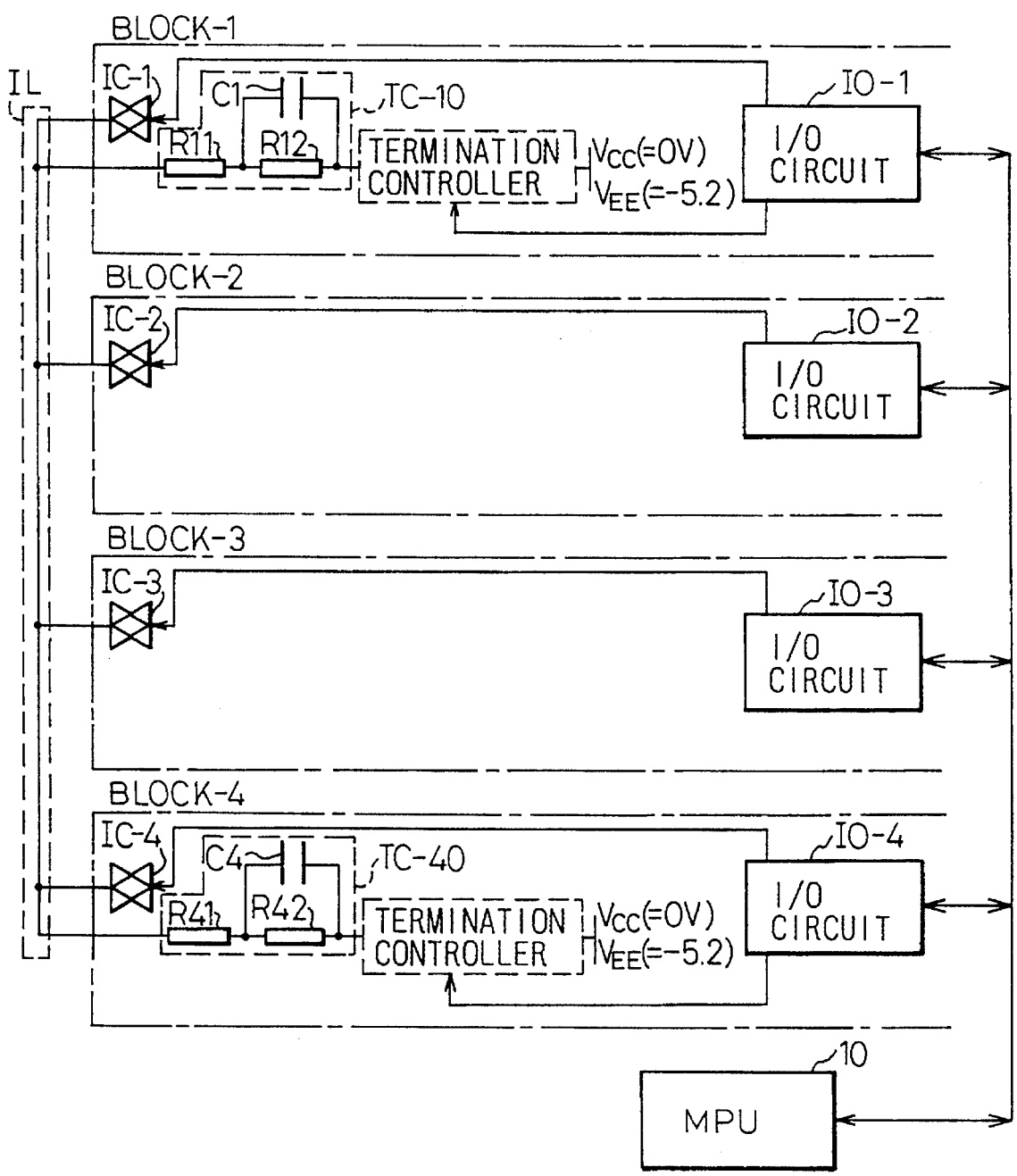
FIG. 14 is a circuit diagram showing a modification of the apparatus of FIG. 13.

FIG. 14 is a circuit diagram showing an apparatus for controlling termination of current driven circuits according to a modification of the embodiment of FIG. 13. Similar to FIG. 13, blocks 1 and 4 are arranged at each end of a bidirectional bus IL. Only these blocks 1 and 4 are provided with termination circuits TC-10 and TC-40 and termination controllers BL-10 and BL-40, respectively.

According to this modification, an MPU 10 provides the direction of transferred data, i.e., a current driven signal through input/output circuits IO-1 to IO-4 provided for blocks 1 to 4, respectively. More precisely, when the data is transferred from an ECL circuit IC-4 to any one of ECL circuits IC-3 to IC-1, or from the ECL circuit IC-3 to one of the ECL circuits EC-2 and IC-1, or from the ECL circuit IC-2 to the ECL circuit IC-1, the MPU 10 provides a control signal to a termination controller BL-10, to connect a termination circuit TC-10. When the data is transferred from the ECL circuit IC-1 to any one of the ECL circuits IC-2 to IC-4, or from the ECL circuit IC-2 to one of the ECL circuits IC-3 and IC-4, or from the ECL circuit IC-3 to the ECL circuit IC-4, the MPU 10 supplies a control signal to the termination controller BL-40, to connect the termination circuit TC-40.

Compared with the apparatus of FIG. 8, the apparatus of FIG. 14 is not required to provide the termination circuits (TCs) and termination controllers (BLs) for every block, nor to provide signal lines for controlling the termination controllers. In addition, the signal identification circuits (SDs) of FIG. 13 are not required, to further simplify the apparatus.

As explained above in detail, the method of and apparatus for controlling termination of current driven circuits according to the present invention bidirectionally transmit and receive a current driven signal at a normal amplitude with simple termination switching control without reducing the impedance of an output stage of each current driven circuit.

Many different embodiments of the present invention may be constructed without departing from the spirit and scope of the present invention, and it should be understood that the present invention is not limited to the specific embodiments described in this specification, except as defined in the appended claims.

What is claimed is:

1. A method of controlling termination of current driven circuits that bidirectionally transmit and receive a current driven signal, comprising the step of:

transmitting the current driven signal from a first one of said current driven circuits and receiving the signal by at least one second one of said current driven circuits while connecting a termination circuit only on a receiver side of said second one of said current driven circuits and disconnecting another termination circuit of said first one of said circuits on a transmitter side.

2. A method of controlling termination of current driven circuits as claimed in claim 1, wherein the current driven signal is an ECL signal, and said current driven circuits are ECL circuits.

3. A method of controlling termination of current driven circuits as claimed in claim 1, wherein the current driven signal is a PCML signal.

4. A method of controlling termination of current driven circuits as claimed in claim 1, wherein said termination circuits are connected and disconnected through transistors.

5. A method of controlling termination of current driven circuits as claimed in claim 1, wherein said second one of current driven circuits is single, and only said termination circuit for said second current driven circuit is connected when said second current driven circuit receives the current driven signal from said first one of said current driven circuits.

6. A method of controlling termination of current driven circuits as claimed in claim 5, wherein said termination circuit for said second current driven circuit is connected in response to a read or write signal for a memory of said second current driven circuit with the read or write signal being latched to extend its active period.

7. A method of controlling termination of current driven circuits as claimed in claim 1, wherein there are a said plurality of said second current driven circuits, said plurality of second current driven circuits receive the current driven signal from said first current driven circuit with said termination circuits for the respective second current driven circuits being connected.

8. A method of controlling termination of current driven circuits as claimed in claim 7, wherein said termination circuits for said second current driven circuits are controlled by a termination controller.

9. A method of controlling termination of current driven circuits as claimed in claim 1, wherein said termination circuits are connected or disconnected in response to termination control signals produced from operation control signals for controlling the operations of the respective current driven circuits.

10. A method of controlling termination of current driven circuits as claimed in claim 9, wherein said termination circuits are connected or disconnected in response to the operation control signals which are the same as the operation control signals for controlling the operations of the respective current driven circuits.

11. A method of controlling termination of current driven circuits as claimed in claim 1, wherein said termination circuits are connected or disconnected in response to the current driven signal.

12. A method of controlling termination of current driven circuits as claimed in claim 1, wherein said termination circuits are connected or disconnected in response to a TTL signal different from the current driven signal.

13. A method of controlling termination of current driven circuits that bidirectionally transmit and receive a current driven signal, comprising the steps of:

connecting only a termination circuit for a first one of said current driven circuits that is connected to an end of a bidirectional bus and disconnecting termination circuits for the other current driven circuits when transmitting the current driven signal in a first direction through said bidirectional bus; and connecting only a termination circuit for a second one of said current driven circuits that is connected to the other end of said bidirectional bus and disconnecting termination circuits for the other current driven circuits when transmitting the current driven signal in a second direction through said bidirectional bus.

14. A method of controlling termination of current driven circuits as claimed in claim 13, wherein the current driven signal is an ECL signal and said current driven circuits are ECL circuits.

15. A method of controlling termination of current driven circuits as claimed in claim 13, wherein the current driven signal is a PCML signal.

16. A method of controlling termination of current driven circuits as claimed in claim 13, wherein said termination circuits are connected and disconnected through transistors.

17. An apparatus for controlling termination of current driven circuits that bidirectionally transmit and receive a current driven signal, comprising:

a bidirectional bus for transmitting the current driven signal, and said current driven circuits connected to said bidirectional bus;

termination circuits provided for the current driven circuits;

a connection means for connecting only said termination circuit for said current driven circuit that receives the current driven signal; and a disconnection means for disconnecting a termination circuit for said current driven circuit that transmits the current driven signal and termination circuits for said current driven circuits that do not transmit nor receive the current driven signal.

18. An apparatus for controlling termination of current driven circuits as claimed in claim 17, wherein the current driven signal is an ECL signal and the current driven circuits are ECL circuits.

19. An apparatus for controlling termination of current driven circuits as claimed in claim 17, wherein the current driven signal is a PCML signal.

20. An apparatus for controlling termination of current driven circuits as claimed in claim 17, wherein said connection means and said disconnection means have each transistors.

21. An apparatus for controlling termination of current driven circuits as claimed in claim 17, wherein one of said current driven circuits receives the current driven signal, and said connection means connects said termination circuit for said current driven circuit that receives the current driven signal.

22. An apparatus for controlling termination of current driven circuits as claimed in claim 17, wherein a plurality of said current driven circuits receive the current driven signal, and said connection means connects said termination circuits for said current driven circuits that receive the current driven signal.

23. An apparatus for controlling termination of current driven circuits as claimed in claim 17, wherein each of the termination circuits has a resistor means and a capacitor means, to regulate the amplitude of the current driven signal in a given range when said termination circuit is connected so that the corresponding current driven circuit receives the current driven signal.

24. An apparatus for controlling termination of current driven circuits as claimed in claim 23, wherein said resistor means has a first resistor means and a second resistor means, an end of said first resistor means is connected to said bidirectional bus, the other end of said first resistor means is connected to an end of said second resistor means and to an end of said capacitor means, and the other end of said second resistor means and the other end of said capacitor means are connected to a power source line through one of said connection means and said disconnection means.

25. An apparatus for controlling termination of current driven circuits that bidirectionally transmit and receive a current driven signal, comprising:

a bidirectional bus for bidirectionally transmitting the current driven signal;

a first one of said current driven circuits connected to an end of said bidirectional bus;

a first termination circuit provided for said first current driven circuit;

a second one of the current driven circuits connected to the other end of said bidirectional bus;

a second termination circuit provided for said second current driven circuit;

a plurality of third ones of said current driven circuits connected to said bidirectional bus between said first and second current driven circuits;

a first control means for connecting said second termination circuit and disconnecting said first termination circuit when the current driven signal is transmitted from one to another of said current driven circuits in a direction from said first current driven circuit toward said second current driven circuit; and a second control means for connecting said first termination circuit and disconnecting said second termination circuit when the current driven signal is transmitted from one to another of said current driven circuits in a direction from said second current driven circuit toward said first current driven circuit.

26. An apparatus for controlling termination of current driven circuits as claimed in claim 25, wherein the current driven signal is an ECL signal and said current driven circuits are ECL circuits.

27. An apparatus for controlling termination of current driven circuits as claimed in claim 25, wherein the current driven signal is a PCML signal.

28. An apparatus for controlling termination of current driven circuits as claimed in claim 25, wherein said first and second control means have each transistors.

29. An apparatus for controlling termination of current driven circuits as claimed in claim 25, wherein each of said termination circuits has a resistor means and a capacitor means, to regulate the amplitude of the current driven signal in a given range when said termination circuit is connected so that the corresponding current driven circuit receives the current driven signal.

30. An apparatus for controlling termination of current driven circuits as claimed in claim 29, wherein said resistor means has a first resistor means and a second resistor means, an end of said first resistor means is connected to said bidirectional bus, the other end of said first resistor means is connected to an end of said second resistor means and to an end of said capacitor means, and the other end of said second resistor means and the other end of said capacitor means are connected to a power source line through one of said connection and disconnection means.

* * * * *